Dec. 15, 1936.  E. SCHNEIDER  2,064,225
REGULABLE MOISTURE EMITTING AND EVAPORATING DEVICE
Filed Sept. 6, 1934
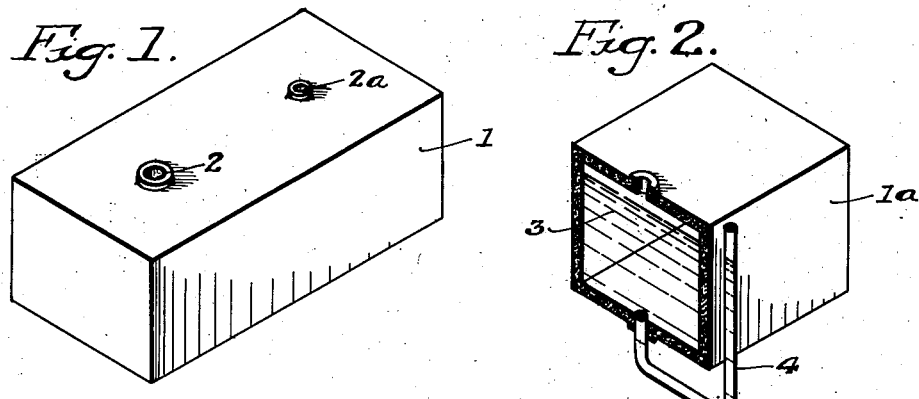
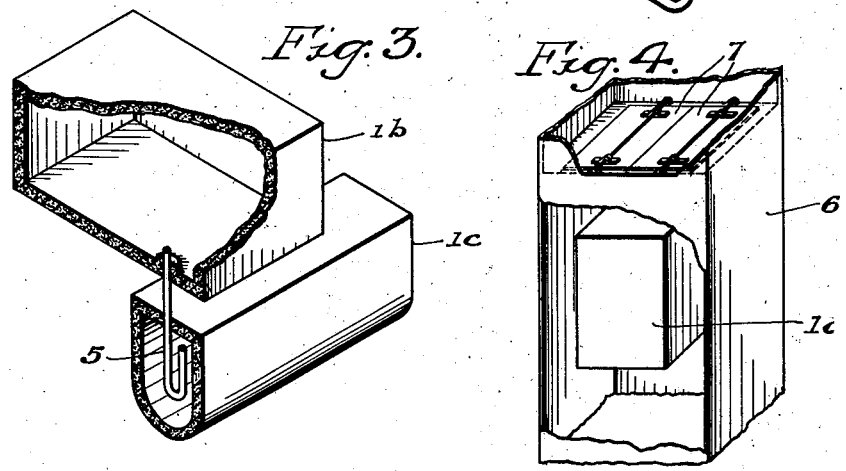
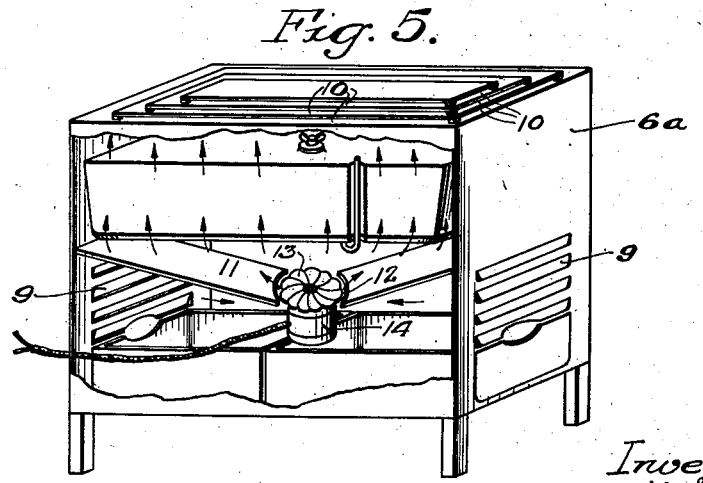
Inventor:-
Emil Schneider Patented Dec. 15, 1936

2,064,225

UNITED STATES PATENT OFFICE 2,064,225

REGULABLE MOISTURE EMITTING AND EVAPORATING DEVICE

Emil Schneider, Philadelphia, Pa.

Application September 6, 1934, Serial No. 742,930

5 Claims. (Cl. 261—99)

This invention relates to a regulable moisture emitting device which operates by a moisture evaporation principle and to apparatus employing the said device in combination with novel means for controlling or stopping the moisture evaporation as desired.

The principal object of the invention is to provide a device which comprises, essentially, a liquid container, made of porous material, the porosity of which is such as to cause the container to emit moisture in useful and practical form and which device is controlled by a novel vacuum principle.

By the term "vacuum" as used herein, I mean any air pressure which is less than atmospheric pressure. The term is used broadly for want of an appropriate, generic, term covering the range of pressures below atmospheric pressure. Thus the term as herein used means any degree of air evacuation.

I have discovered that a closed container having a porous wall or walls constructed of a material which has microscopic, interlinked pores, such as certain grades of terra cotta for example, having the property of emitting moisture from a liquid body contained therein, may be usefully controlled or regulated in its operation and that advantage may be taken of this fact to provide various devices adapted to perform different functions. I have discovered further that a novel method of evaporation control may be effected by providing a regulable closure about the container.

The invention may be fully understood by those skilled in the art from the following detailed description and the accompanying drawing illustrating several applications of the underlying principles.

In the drawing,

Fig. 1 is a perspective view of a closed porous container forming the nucleus of the invention;

Fig. 2 is a sectional perspective view of a similar container with an added feature;

Fig. 3 is a similar view illustrating another embodiment;

Fig. 4 is a partial perspective view of a device embodying a structure for controlling the evaporating activities of the device, a portion of the device being broken away for clarity of illustration; and Fig. 5 is a perspective view of another device embodying the invention with the front wall removed to expose the parts.

Referring to Fig. 1 there is shown a container 1 which is completely closed except for a liquid filler opening 2, to which may be attached any conventional device for refilling and which may be closed in any suitable manner, and another opening 2a, the purpose of which will be described hereinafter. This container is constructed of porous material such as above mentioned, preferably terra cotta. A liquid, such as water, (not visible) substantially fills the container. The liquid penetrates and fills the pores of the lower portion of the container. The pores of that portion of the container above the liquid level are filled and sealed with liquid due to capillary action which takes place after the liquid is poured into the container. This effectively seals the container against the admission of air from the outside. In a container of relatively large dimension, portions of the upper surface of the container may be rendered non-porous in any suitable manner to assure permanently that no air will enter the container.

The outer surface of the container becomes damp as the liquid seeps through the pores. Assuming that the openings, 2 and 2a, are closed, as the liquid level lowers, the air pressure on the liquid inside the container decreases, or in other words the degree of air evacuation of the container increases until a balance of forces, acting upon the liquid is reached, at which time the liquid is restrained from penetrating the container walls. The balance of forces is a balance between the vacuum inside the container on the one hand and the gravitational force due to the weight of the liquid and capillary action on the other hand.

The vacuum inside the vessel tends to restrict the flow of liquid, while the gravitational force and capillary attraction tend to draw the liquid through the vessel wall. The capillary attraction increases in proportion to increase of circulation or temperature of the surrounding air.

Inasmuch as the emitted moisture is absorbed by the exterior air, the liquid containing vessel finds useful application in air humidification. The interior of the vessel is maintained at a relative lower temperature, apparently due to a heat insulating characteristic imparted to the device by the above described action. Any rise in temperature within the vessel is resisted by the moisture filled walls, the lowered air pressure inside the vessel, and the moisture emission in response to any rise of temperature of the outside air. This characteristic may be used to advantage as a moderate cooling insulating means for preserving of articles, as will appear more fully hereinafter.

The moisture emitting action may be controlled to render the device more practical by admitting air, whenever desired, through opening 2a, to vary the degree of air evacuation. This control may be effected manually or automatically by any suitable device. Where it is desired to decrease the air pressure inside another closed chamber, the control may be utilized to serve a dual function by connecting an air tube or conduit between opening 2a and the said other chamber, thus effecting the desired control of the vacuum in vessel 1 and also the desired diminution of air pressure inside the other chamber.

In Fig. 2 there is shown a similar container, 1a, substantially filled with a liquid 3, which is provided with an added feature comprising a small diameter tube or conduit, 4, leading into the container and extending from the bottom thereof in the form of a U to a point outside the container above the level of the liquid. The liquid in the tube seeks the level of that in the container. Normally air is prevented from entering the container via the tube because of the liquid therein. As the above described action takes place, however, the degree of air evacuation inside the container finally becomes such as to draw the water out of the tube into the container and allow a small quantity of air to enter the container at the bottom thereof. The air thus admitted to the container rises through the liquid to the space thereabove and decreases the degree of air evacuation, allowing liquid from the container to again enter the tube. This action is momentary and spasmodic and it takes place at intervals during the moisture emitting action. This added feature increases the practical utility of the container in that it serves to limit the air evacuation to the desired degree.

Instead of using a single container, a plurality of inter-connected containers may be used, as illustrated in Fig. 3. An upper container 1b is shown connected to a lower container 1c by a U-pipe 5. The liquid from the upper container 1b flows or is withheld from flowing through the U-tube 5 into lower container 1c. In this manner the actions governing liquid release or retention in the two containers are maintained in balanced relation. This device may be used, for example, as a humidifying device. By using two inter-connected containers, the capacity of the device is increased without the necessity of employing a large container. Only one filling opening in the container 1b is required, the container 1c being supplied with liquid from container 1b. The two containers operate as a balanced dual unit.

In Fig. 4 is shown an air humidifying device comprising a casing or air conduit, 6, within which there is a moisture-emitting device 1d of any preferred type. The casing surrounding the moisture-emitting device directs air to and about the said device, enhancing the moisture evaporating action thereof. The casing is provided with adjustable shutters 7, or the like, to control the flow of air through conduit 6.

In Fig. 5 there is shown another form of air humidifying device comprising a casing 6a and a moisture-emitting device of the type shown in Fig. 2.

Air ingress openings 9 are provided in the vertical side walls, as shown, while air egress openings 10 are provided in the top of the casing. The baffle wall 11 with an opening 12 therein serves with the said openings to form a circuitous path or paths for air, as shown by the arrows. The fan 13 which is of close blade formation substantially fills the opening 12. With the fan idle, the air flow is restrained and rendered substantially nil, particularly as there is little or no natural tendency for air to flow horizontally. With the fan in action, however, air is forced through the device into contact with the moisture-emitting device, thus causing evaporation. Thus the casing and associated elements form an effective air seal about the moisture-emitting device when the fan is idle, substantially preventing moisture emission and evaporation at that time.

The fan may be driven by a motor 14, the energization of which may be controlled by any suitable means. Automatic operation may be effected by conventional control devices for air conditioning purposes.

Although the invention is illustrated and described herein with particular reference to certain embodiments, it will be understood that no limitations are placed upon the invention other than those contained in the appended claims.

What I claim is:

1. In a device of the class described, a casing having air ingress and egress openings therein, a closed container within said casing, said container being constructed of porous material with microscopic pores such that a liquid contained in the container is restrained from flowing through the pores by the partial vacuum above the liquid surface, a tube extending exteriorly of said vessel from the bottom thereof to a point above the level of the liquid in the container, a motor-driven fan within said casing arranged to effect an air flow through said casing about said container, and means for controlling said fan in accordance with the condition of the air about the device.

2. In a device of the class described, a container constructed of porous material of such porosity that a liquid contained therein is restrained from flowing through the pores by the partial vacuum above the liquid surface, and means for varying said vacuum to vary the rate of liquid flow through said pores.

3. In a device of the class described, a container constructed of porous material of such porosity that a liquid contained therein is restrained from flowing through the pores by the partial vacuum above the liquid surface, and means for varying said vacuum to vary the rate of liquid flow through said pores, said means comprising a tube extending exteriorly of said container from the lower portion thereof to a point above the liquid surface.

4. In a device of the class described, a container constructed of porous material of such porosity that a liquid contained therein is restrained from flowing through the pores by the partial vacuum above the liquid surface, means for varying said vacuum to vary the rate of liquid flow through said pores, a casing surrounding said container to direct air thereabout, and means for controlling the flow of air through said casing.

5. In a device of the class described, a container constructed of porous material of such porosity that a liquid contained therein is restrained from flowing through the pores by the partial vacuum above the liquid surface, means for varying said vacuum to vary the rate of liquid flow through said pores, a casing surrounding said container to direct air thereabout, actuatable means adapted when active to force air circulation through said casing and adapted when inactive to substantially prevent air circulation through said casing, and means for controlling said last means.

EMIL SCHNEIDER.